United States Patent [19]

D'Hoore et al.

[11] Patent Number: 5,007,201

[45] Date of Patent: Apr. 16, 1991

[54] DOOR CONSTRUCTION

[75] Inventors: Terence P. D'Hoore, Mishawaka, Ind.; Mark L. Smith, Niles, Mich.

[73] Assignee: Excel Industries, Inc., Elkhart, Ind.

[21] Appl. No.: 504,390

[22] Filed: Apr. 4, 1990

[51] Int. Cl.$^5$ .............................................. E05F 11/38
[52] U.S. Cl. ...................................... 49/348; 49/502; 49/349
[58] Field of Search ................................ 49/348-353, 49/374-376, 502

[56] References Cited

U.S. PATENT DOCUMENTS

| | | | |
|---|---|---|---|
| 1,595,499 | 8/1926 | Birk | 49/353 X |
| 1,754,623 | 4/1930 | Geuss | 49/353 |
| 2,236,450 | 3/1941 | Roethel | 49/376 X |
| 4,306,381 | 12/1981 | Presto | 49/502 |
| 4,648,208 | 3/1987 | Baldamus et al. | 49/502 |
| 4,761,915 | 8/1988 | März | 49/374 |

Primary Examiner—Gary L. Smith
Assistant Examiner—Jerry Redman
Attorney, Agent, or Firm—Thomas J. Dodd

[57] ABSTRACT

A vehicle door construction which includes a door frame which defines integral longitudinal screw grooves for seating fasteners used to mount cross braces to which the window regulator assembly is mounted. The frame may also include a lower recess to collect debris and an outer channel to allow fasteners mounting a window guide brace to be countersunk for easier mounting of the door frame in the vehicle. The frame may also include a removable insert which defines the window slide channel to allow rapid replacement of a broken window.

6 Claims, 3 Drawing Sheets

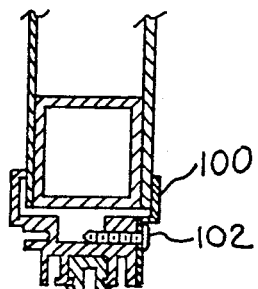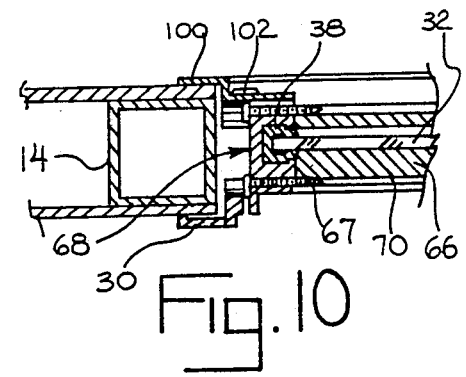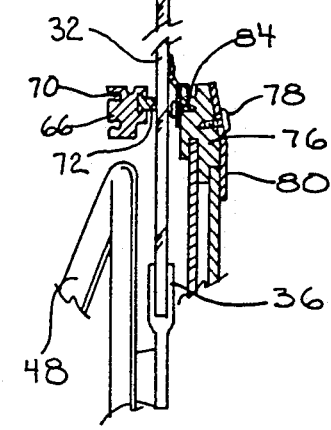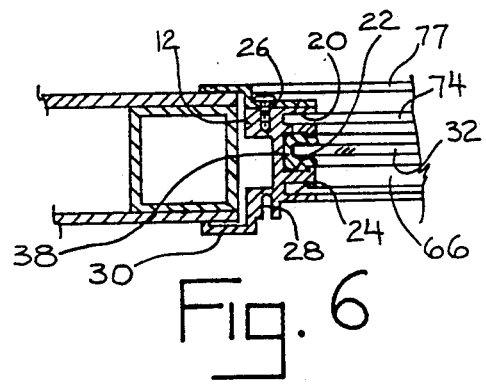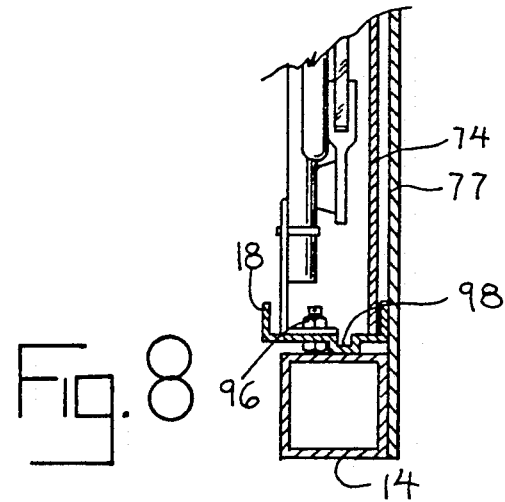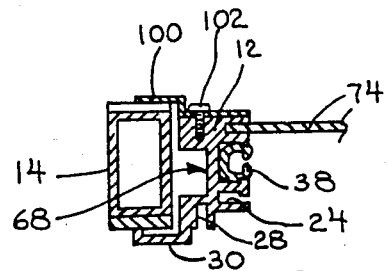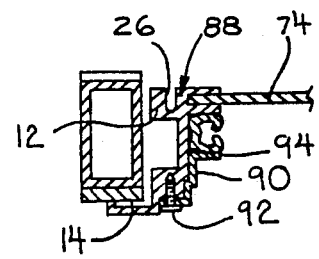

5,007,201

DOOR CONSTRUCTION

SUMMARY OF THE INVENTION

This invention relates to a door construction and will have application to a recreational vehicle door which includes a roll up window.

Previously, doors with roll up windows used in various recreational vehicles included peripheral frames which required extensive milling in order to provide for mounting channels to secure the cross rails and door panel to the frame. Further, the inner trim of previous door frames were of single piece construction, which made window replacement very difficult and expensive.

The door of this invention includes a single piece extruded peripheral frame which includes preformed channel parts to accommodate the mounting screws for the cross rails and for the door panel. The frame also defines an outer channel which allows the inner trim rail mounting screws to be countersunk into the door frame. Also, the lower trim insert is removable from the rest of the trim to allow for rapid window replacement. Finally, the lower trim rail is stepped to provide a channel for the window to rest in and also to provide a drain for moisture and other debris which may accummulate inside the frame.

Accordingly, it is an object of this invention to provide for a novel and improved vehicle door frame.

Another object is to provide for a vehicle door which is economical to construct and easy to install.

Another object is to provide for a vehicle door which allows rapid access to the window for repair or replacement purposes.

Still another object is to provide a vehicle door which is aesthetically pleasing.

Other objects of this invention will become apparent upon a reading of the following description.

BRIEF DESCRIPTION OF THE DRAWINGS

FIG. 3 is an enlarged view of the door as seen in circle 3 of FIG. 2.

FIG. 4 is an enlarged view of the door as seen in circle 4 of FIG. 2.

FIG. 5 is an enlarged view of the door as seen in circle 5 of FIG. 2.

FIG. 6 is a cross-sectional view taken along line 6—6 of FIG. 1.

FIG. 7 is a cross-sectional view taken along line 7—7 of FIG. 1.

FIG. 8 is an enlarged view of the door as seen in circle 8 of FIG. 2.

FIG. 9 is a cross-sectional view taken along line 9—9 of FIG. 1.

FIG. 10 is a cross sectional view taken along line 10—10 of FIG. 1.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize its teachings.

Figure 1:
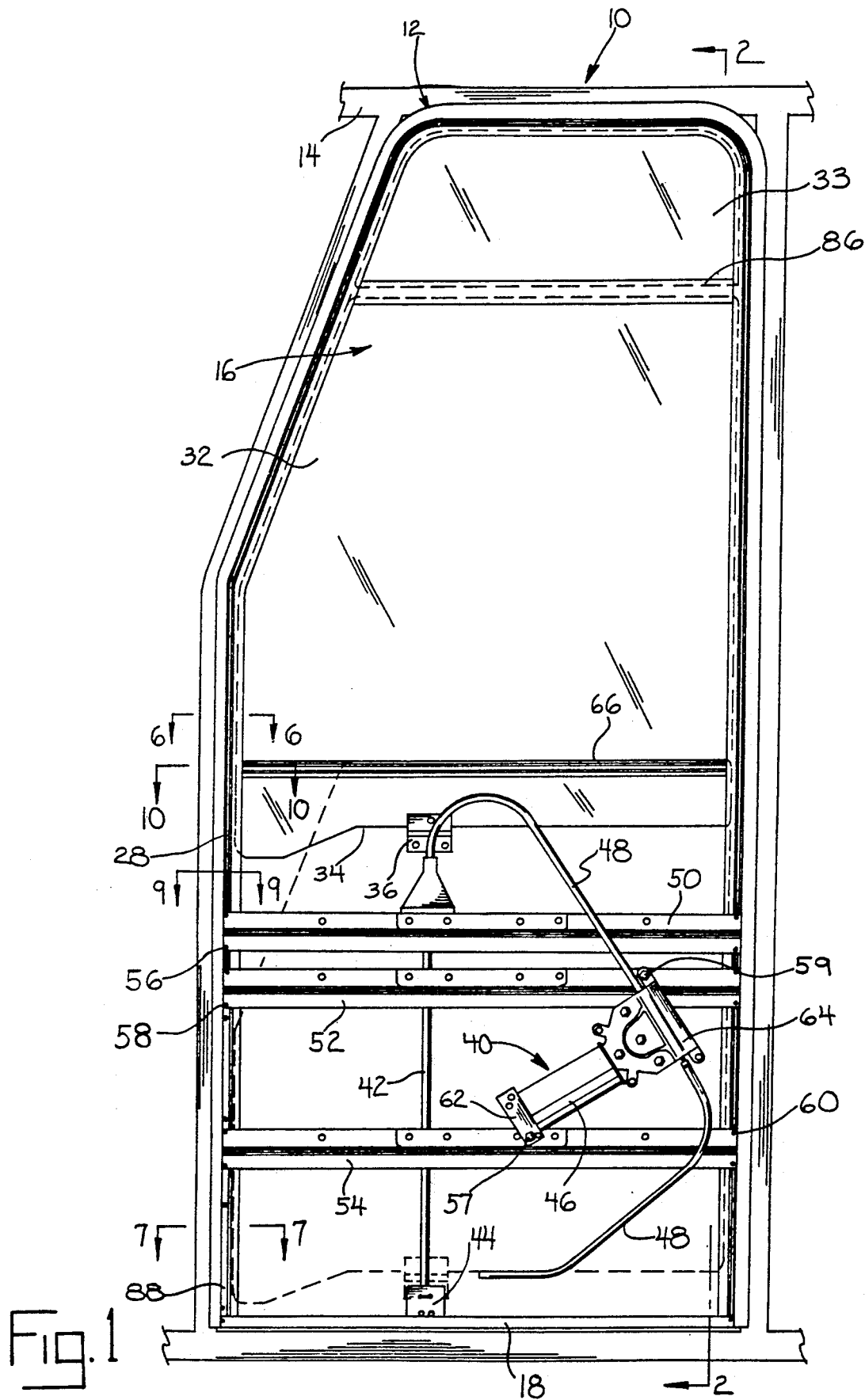
FIG. 1 is a perspective view of the door construction of this invention.
Figure 2:
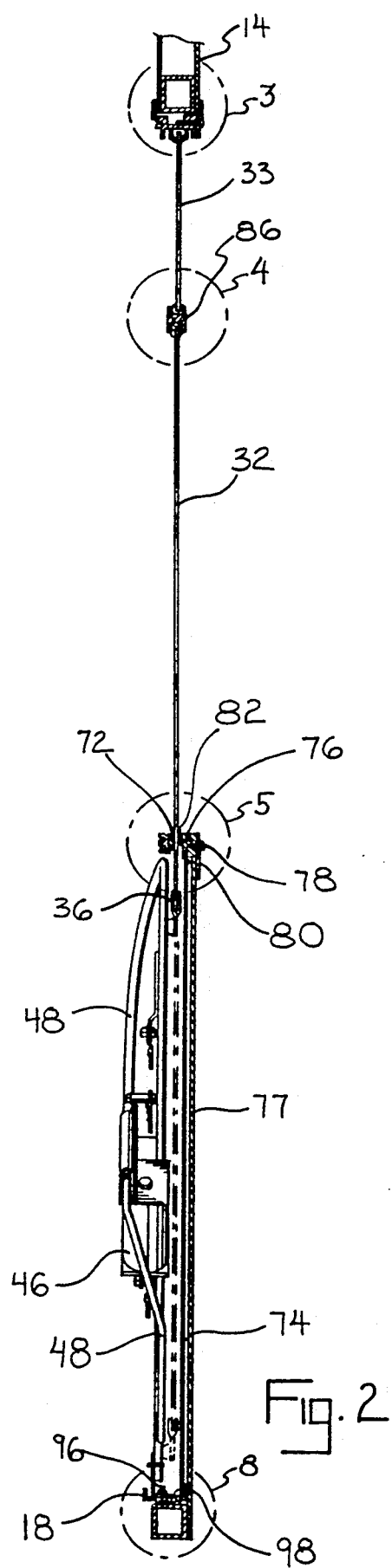
FIG. 2 is a sectional view taken along line 2—2 of FIG. 1.

Referring now to FIG. 1, reference numeral 10 refers generally to the door construction of this invention. As shown, door 10 includes an outer frame 12 which is preferably formed of extruded metal and which is secured in a conventional manner to a vehicle frame 14. Door 10 is generally adapted for use in motor homes, but will no doubt find usefulness in a wide variety of recreational vehicles and trucks which utilize similar type doors. Frame 12 as shown accommodates a sliding window assembly 16 which may be raised and lowered as desired to provide ventilation to the interior of the vehicle (not shown).

Frame 12 is of the general cross-sectional configuration shown in FIGS. 6 and 9 and defines the sides and top boundaries of door 10. A bottom frame part 18 (see FIG. 8) is secured to frame 12 and defines the lower boundary of door 10.

Frame 12 as shown defines inwardly oriented channels 20, 22 and 24. A pair of oppositely located grooves 26, 28 are defined in frame 12 with the grooves oriented in a transverse relationship with respect to channels 20, 22 and 24. Frame 12 may also include a mounting flange 30 which extends outwardly from the frame adjacent groove 26. It should be noted that all orientation descriptions are given as the door 10 is preferably oriented in the vehicle and are not intended to be limiting as to the specific shape of frame 12 or its orientation in the vehicle. Frame 12 is preferably bent into a desired configuration by conventional means in order to fit within the space allotted for the door 10 in vehicle frame 14.

Window assembly 16, as is common in the industry, includes glazing panel 32 which is connected at its bottom edge 34 to support bracket 36. Glazing panel 32 slides between its up position and the full down position (shown in dotted lines in FIG. 1) within frame channel 22. A gasket seal 38 is fitted in channel 22, with glazing panel 32 riding in the seal.

Support bracket 36 is slidable connected to a regulator assembly 40 which is shown as a power actuated assembly in the drawings. Assembly 40 is common in the industry and includes slide rod 42 which accommodates bracket 36 and is attached to bottom frame rail 18 through a bracket assembly 44. Assembly 40 also includes motor 46 and cables 48 which are arranged in a manner common to the automotive power window industry and will not be described in detail.

Regulator assembly 40 is mounted inside door 10 as shown in FIG. 1. A plurality of cross braces 50, 52, 54 span door frame 12 and are fixed to opposite sides of the frame by fasteners 56, 58, 60 which extend through a respective cross brace and are seated in frame grooves 26. Motor 46 is mounted to braces 52, 54 by fasteners 57, 59 which extend through motor mounts 62, 64 as shown.

Door 10 also includes a window guide brace 66 which spans frame 12 and is secured thereto by fasteners 67 which extend through channel 68 of the frame and into grooves 70 of the guide brace. Guide brace 66 carries weatherstripping 72 which seals against leakage into the interior compartment of the door.

An inner protective panel 74 preferably formed of metal spans the lower portion of frame 12 and is secured in channels 20 by conventional means such as welding. An upper trim rail 76 is connected to panel 74 as shown in FIG. 5. An outer door panel 77 is connected to rail 76 through fastener 78 and molding strip 80. Weatherstripping 82 is secured to trim rail 76 by fasteners 84 and seals against leakage into the interior of the door 10.

Window assembly 16 may be of either a one piece glazing panel 32 or of the two panel variety shown with panels 32 and 33. In the embodiment shown only panel 32 shifts between the down and up positions upon actuation of regulator 40 with window 33 fixedly mounted in frame 12 and upper rail 86.

FIG. 7 illustrates the construction of lower frame insert 88 which is aligned continuously and is integral with frame 12. Frame insert 88 is similar to frame 12 with the exception that the walls which form channels 22, 24 are eliminated and replaced by insert piece 90 which is secured to insert 88 through fastener 92 which extends through the insert piece and is seated in groove 26. Insert piece 90 includes an integral flange 94 which serves to define channel 22 which houses gasket seal 38 and glazing panel 32 when the window is in the down position.

Lower frame insert 88 allows for easy and rapid removal of glazing panel 32 should repair or replacement be necessary. By removing the inner door panel (not shown) which conceals regulator 40 and the other internal mechanical components of door 10, and then removing fastener 92 and insert piece 90, a broken or defaced glazing panel 32 may be slid out of gasket seal 38 and out of the door without further operations.

FIG. 8 best illustrates the construction of lower frame rail 18. Frame rail 18 is substantially U-shaped and is secured to frame 12 by fasteners 96 which are seated in screw groove 26 as shown in FIG. 8. Frame rail 18 includes an integral stepped recess part 98 as shown in FIG. 8 which acts as both a safety well for glazing panel 32 with which it is aligned, and as a debris collector for dust and moisture which eventually accumulates inside door 10.

Finally, door 10 includes common decorative trim molding 100 about its periphery. Molding 100 is secured to frame 12 by fasteners 102 which extend into grooves 28 as shown in FIGS. 6 and 9.

It should be noted that door 10 may be connected in any common manner to vehicle frame 14, such as hinges, slides, or even fixed connections without departing from the spirit of the invention whose scope is defined in the following claims.

We claim:

1. In a door construction including a peripheral door frame defining opposite sides, cover panel secured to said door frame, said door frame including means for housing a reciprocative window, and means for shifting said window between up and down positions, the improvement wherein said door frame defines a groove running substantially the length of said frame, mounting braces, carrying side means for shifting, said mounting braces spanning said door frames, said mounting braces connected to said frame sides by fasteners extending through the mounting braces and seated in said groove, a channel oriented transverse with respect to said groove, an outer door panel seated in said channel.

2. The door construction of claim 1 wherein said frame defines a second groove or an opposite site of said frame from said first mentioned groove, trim molding secured to said door about its periphery by fasteners extending through said molding and seated in said second groove.

3. The door construction of claim 1 wherein said frame further defines a second channel adjacent to and oriented parallel with said first mentioned channel, said reciprocative window movably seated in said second channel.

4. The door construction of claim 3 and a window guide brace spanning said frame and having a longitudinal groove, said frame including a recessed channel defined in a side of said frame opposite of said second channel, said guide brace secured to said frame by fasteners extending through said frame recessed channel in a countersunk manner and seated in said guide brace groove.

5. The door construction of claim 1 wherein said door frame includes a separate lower frame rail secured to the door frame, said lower frame rail including a recess part for collecting debris, said recess part aligned with said window.

6. The door construction of claim 3 wherein a portion of said frame includes an insert removably secured to the frame, said insert including a protruding flange, said flange and a wall of said first mentioned channel defining said second channel.

* * * * *